United States Patent [19]

Oehler

[11] Patent Number: 5,349,853

[45] Date of Patent: Sep. 27, 1994

[54] APPARATUS AND METHOD FOR MEASURING AND CALCULATING EXTERIOR AND INTERIOR BALLISTICS

[76] Inventor: Kenneth L. Oehler, 1308 Barclay Dr., Austin, Tex. 78746

[21] Appl. No.: 998,850

[22] Filed: Dec. 30, 1992

[51] Int. Cl.⁵ .......................... G01L 5/14; G01P 5/18; G01P 13/00; G01S 15/00
[52] U.S. Cl. ..................... 73/167; 364/565; 364/558; 364/517; 102/425
[58] Field of Search .................. 73/167; 364/565, 558, 364/516, 517; 273/371, 372; 102/420, 425

[56] References Cited

U.S. PATENT DOCUMENTS

| | | | |
|---|---|---|---|
| 3,127,768 | 4/1964 | Mason | 73/167 |
| 3,260,107 | 7/1966 | Rosen | 73/167 |
| 3,792,354 | 2/1974 | Slaght et al. | 73/167 |
| 4,131,012 | 12/1978 | Courtiol | 73/167 |
| 4,147,055 | 4/1979 | Wood et al. | 73/167 |
| 4,845,690 | 7/1989 | Oehler | 364/565 |
| 5,067,096 | 11/1991 | Olson et al. | 364/517 |

FOREIGN PATENT DOCUMENTS

| | | | |
|---|---|---|---|
| 2605412 | 4/1988 | France | 73/167 |
| 0265058 | 2/1989 | German Democratic Rep. | 73/167 |

OTHER PUBLICATIONS

Kernin, W., "Quartz Pickups Measure Pressure," Radio-Electronics, pp. 36–38 (Oct. 1962).

*Primary Examiner*—William A. Cuchlinski, Jr.
*Assistant Examiner*—Diego F. F. Gutierrez
*Attorney, Agent, or Firm*—Ronald R. Snider; K. L. Orzechowski; Walter C. Farley

[57] ABSTRACT

An apparatus and method for measuring ballistics in a firearm is disclosed. The apparatus comprises (a) a device for measuring pressure in a firearm-firing-chamber disposed at least in part at the strain sensitive region, and for producing analog signals indicative of the pressure, and connected to digitizing circuits which record the amplitudes of the signals representing pressure as a function of time; (b) a plurality of muzzle bullet sensors for measuring the relative times at which the bullet passes the plane of each sensor and for producing analog signals indicative of these times, the analog signals being converted to digital signals and connected to digital timing circuits; and (c) an acoustic target located downrange and including (i) sensors arrayed at corners of a triangle for sensing acoustic energy emitted by a passing bullet and (ii) a device for generating analog signals representative of the acoustic energy sensed at the triangle corners. The pressure in the firing chamber is measured according to the formula:

$$PSI/\text{bit} = \frac{2.13\, N(D^2 - (d - 0.025)^2)}{G\,(d - 0.025)^2}$$

$$N = \frac{PSI_{Max}\, G\,(d - 0.025)^2}{435\,(D^2 - (d - 0.025)^2)}$$

and where
  $PSI_{Max}$ is Maximum expected PSI,
  N is the gain port setting which is a digital setting to an amplifier gain port and is expressed as an integer from 20 to 255,
  G is the gage factor,
  D is the outside diameter of the firing chamber at the gage, and
  d is the inside diameter of the firing-chamber at the gage. Optionally, a plurality of bullet sensors may be located downrange in lieu of the downrange acoustic target. Analog signals are converted to digital signals which in turn are connected to timing circuits. Signals from the timing circuits are connected to a processor which calculates external and internal ballistics such as for example, velocity and time-of-flight using the common time-zero reference, and determines the location of "hit" at a target plane. The processor can be interfaced with a personal computer.

28 Claims, 4 Drawing Sheets

APPARATUS AND METHOD FOR MEASURING AND CALCULATING EXTERIOR AND INTERIOR BALLISTICS

BACKGROUND OF THE INVENTION

1. Field of the Invention

The present invention is related generally to methods and apparatus for measuring and calculating exterior and interior ballistics of a projectile and diagnosing the hit parameters of a launcher, and more particularly to a system and methods for measuring and calculating the velocity of said projectile, the time the projectile reaches the point downrange, the downrange point velocity, the energy imparted to the projectile at its exit from a launcher, pressure in a launcher, and determining the location of hit.

2. Description of the Related Art

The following patents are exemplary of current state-of-the-art active devices and methods for either external (outside the gun barrel) or internal (within the gun barrel) ballistics measurements and are not discussed in detail as their differences from the present invention are obvious from a cursory examination: U.S. Pat. No. 2,691,761 (Smith), U.S. Pat. No. 2,735,981 (Schultz et al.), U.S. Pat. No. 3,918,061 (Elgaard), U.S. Pat. No. 4,283,989 (Toulios et al.), U.S. Pat. No. 4,457,206 (Toulios et al.), U.S. Pat. No. 4,486,710 (Schmidt), and U.S. Pat. No. 5,159,396 (Yuhas).

Also known to the applicant are numerous patents relating to passive devices for measuring the velocity of a projectile as it travels between two points. For example, U.S. Pat. No. 4,770,527 (Park), discusses measurement of the velocity of a projectile as it travels between two points. Park includes an apparatus for determining the velocity of a projectile, and comprises optical means for generating a planar array of light beams. Chronographs of the type under particular consideration herein are based on the well-known relationship that velocity of a projectile is equal to the distance traveled by the projectile divided by the time required to travel that distance. Systems such as those shown in U.S. Pat. Nos. 3,824,463; 4,128,76;1; and 4,239,962, all to the present inventor, illustrate devices for this purpose as they have been used in the past. U.S. Pat. No. 4,845,690 to the present inventor discloses an improved chronograph which is capable of indicating the possibility that an error has occurred while the shot sequence is still in progress, essentially on a "real time" basis, so that erroneous data can be eliminated before statistical analysis is accomplished.

There are several prior art devices for tracking moving targets that use acoustic sensors for sensing the acoustic signal and for determining the location at which a projectile passes through or strikes a predetermined plane and which are known to the applicant, however, none of these adequately meet all of the objectives of the present invention. For example, U.S. Pat. No. 5,067,096. and U.S. Pat. No. 5,095,467 (both issued to David P. Olson), both discuss a passive acoustic target tracking system for determining the bearing to a ground object emitting acoustic energy. The system includes three microphones arrayed at corners of an equilateral triangle for sensing acoustic energy emitted by a target, means for generating analog signals, means for conditioning the analog signals, and means for converting the analog signals to digital signals. The bearing to the target is determined trigonometrically from the time differences at which the acoustic wave appears at the microphones. The microphone array is used only to determine the direction from which a planar wave front arrives at the microphones. U.S. Pat. No. 5,025,424 (Rohrbaugh) discloses automatic shock wave scoring apparatus for scoring the "hit" on a supersonic projectile in a target area where the "hit" is determined from the detection of the acoustic ballistic shock wave. The system is based on a rod sensor configuration of non perpendicular curved rod sensors which define a scoring grid based on the intercept of the radial lines from the center of curvature of each curved rod through the tangent impact point (acoustic score point) on each rod. Sensors at the bottom of the target plane can be readily shielded from bullets. The following patents show the historical development of the prior art of devices for and methods of scoring supersonic projectiles: U.S. Pat. No. 2,916,289 (Zito), U.S. Pat. No. 2,925,582 (Mattel, et al.), U.S. Pat. No. 2,934,346 (Mongello), U.S. Pat. No. 2,973,964 (Zito), U.S. Pat. No. 3,022,076 (Zito), U.S. Pat. No. 3,217,290 (Sillman), U.S. Pat. No. 3,392,979 (Wilska), U.S. Pat. No. 3,479,032 (Ohlund, et al.), U.S. Pat. No. 3,778,059 (Rohrbaugh), U.S. Pat. No. 4,261,579 (Bowyer), and U.S. Pat. No. 5,025,424 (Rohrbaugh).

Pressure transducers (pressure sensors), inclusive resistive strain transducers, are well known in the prior art and need not be described specifically herein.

All of the prior art patents have numerous problems with accuracy being one of the leading problems. To date, no prior art is known that meets all of the objectives of the present invention, that is, to provide a system and method that would measure and calculate exterior and interior ballistics of a projectile and diagnose the hit parameters of a launcher. Moreover, prior art test systems used in the field often fail to provide adequate data for analysis of test performance due to low signal level and infrequent and unpredictable downrange arrival times. Prior art systems are also too costly to produce and have little flexibility in terms of their capability. There is therefore a need for a device which will measure the external and internal ballistics without the need for laborious hand calculations. There is also a need for a versatile device which will provide the accuracy and reliability of measurements. There is also a need for such a device having considerable flexibility for improvements and modifications and which is inexpensive to manufacture.

DEFINITIONS

Unless defined otherwise, all technical and scientific terms used in this specification, including the claims, have the same meaning as commonly understood by one of ordinary skill in the art to which this invention belongs. The entire text of all applications, patents, and publications, cited above and below, is expressly incorporated by reference.

The following definitions will unequivocally set their context for the present invention.

As used herein, the term "acoustic energy" is intended to mean either a pressure wave generated by a subsonic projectile or a shock wave generated by a supersonic projectile.

The term "pressure sensor" is intended to refer to any assembly comprising the element for sensing pressure, stress or strain along with the protective housing in which the element is mounted, and the term may also include various electrical circuits for converting changes in electrical characteristics to corresponding changes in the electrical characteristics, such as amplitude and/or frequency, of corresponding pressure-, stress-, or strain-related electrical signal.

The term "strain gauge" or "strain gage" may be interchangeably used and includes transducers which have been commercially developed including resistance (piezo-resistive) type strain gages such as, for example, bare-wire bondable strain gages, bondable wire strain gages on a paper or plastic carrier base, metal- foil bondable strain gages, semiconductor strain gages and deposited-metal (thin film) strain gages. In addition, equivalent strain gauges to those described are known in the art and will be apparent to the ordinarily skilled artisan.

The term "projectile" includes any structure of the type capable of being whether launched, projected from a firearm, a hand-bow, a cross-bow, a golf-club, a bat or like device, or thrown or propelled by any other means, but the projectile of this invention is preferably any size bullet. In addition, equivalent projectiles to those recited are known in the art and will be apparent to the ordinarily skilled artisan. Thus, the definition of the word projectile should be recognized as applicable in its broadest meaning. "Bullet" and "projectile" will be used interchangeably throughout this disclosure.

The terms "computer," "computer system," "microcomputer" and "dam processor-based controllers" may be interchangeably used to mean the system that uses digital information and could be any such system. The range of computers of most interest herein encompasses those broad families of personal computers and portable computers. The term "personal computer" means a relatively low-cost mass-produced general purpose digital computer having typically RAM, a keyboard, peripheral memory, and display means. The term "portable computer" means a computer which is usually self contained and readily transportable by individuals and usable at any desired location, and is commonly known by numerous names, such as, for example, a notebook computer, a lap-top computer, a hand-held computer, a portable microcomputer or a wrist-watch computer. The skilled artisan will readily understand and appreciate that when the term "portable computer" is used, the entire range of portable systems processing digital position information is intended. The computer plays no role other than as a consumer of the information. The computer may be connected to a display system by any of the usual means for transmitting electrical signals, e.g. copper cable, fiber optic cable, or modulated RF signals.

The term "device" is any physical piece of equipment integral with the computer, such as a mass storage unit, printer, monitor, console, etc. In terms of internal communication within the computer, a "device" is treated or considered in the same manner as a file.

The term s, "program," "computer program," "software," and "software program" may be interchangeably used to mean a series or sequence of predetermined instructions which are used to control the operation of the processor and its associated hardware components (display screen, printer, etc.).

The term "ammunition" or "ammo" means any combination of propellant, projectile, and means of ignition for the propellant, all three of which may be included in a mechanical package such as, for example, a cartridge case. The skilled artisan will readily understand and appreciate that when the term "ammunition" is used the entire range of assemblies of propellant, projectile, and initiating means in other forms such as in muzzle loading weapon where no metallic case or other package is required. Thus, the definition of the term "ammunition" should be recognized as applicable in its broadest meaning. "Ammunition" and "ammo" will be used interchangeably throughout this disclosure.

The following abbreviations shall have the meanings indicated:

PSI—Pressure expressed in pounds-per-square-inch
$PSI_{MAX}$—Maximum expected PSI;
N—the gain port setting;
G—the gage factor;
D—the outside diameter of the firing-chamber at the gage;
d—the inside diameter of the firing-chamber at the gage;
PVC—polyvinyl chloride
RAM—random access memory
fps—feet per second

SUMMARY OF THE INVENTION

In view of the preceding limitations of known devices for measuring ballistics of a launcher, and more particularly in a firearm firing-chamber, and velocity at a predetermined point it is an object of the present invention to provide methods and apparatus for measuring pressure in a firearm-firing-chamber.

An apparatus for measuring pressure in a firearm firing-chamber achieves these objectives by providing, in combination, means for measuring the pressure in a firearm-firing-chamber and means for measuring velocity and producing an analog signal indicative of the pressure, means for receiving separate streams of analog signals from above-indicated means, and for converting the separate streams of analog signals from analog to digital form and for outputting the separate streams as digital signals, and signal receiving means for receiving the separate streams of digital signals as a data output set. The apparatus may further include a processing means having a random access memory for storage of both operating program and measured data, and means for transferring any of the digital signals to said random access memory, and means for both receiving the program from a controlling computer and for sending the data to the controlling computer. The computer means may further have means for storing reference information data and associating the reference information data for retrieval with the data output set at a later time and means for inputting reference information data. The apparatus may further comprise one or more devices having display means operatively coupled to the calculating means for providing a visual display of the exterior and interior ballistics of a projectile.

In accordance with one embodiment, the means for measuring the pressure includes a strain detector disposed at least in pan on a strain sensitive region of said firearm-firing-chamber, the strain gauge having a piezoresistive means having a resistance varying in response to the strain of the sensitive region; the piezo-resistive means being oriented to achieve maximum response from the strain at the outer surface of the firearm-firing chamber; a means for supplying to the strain detector a predetermined constant electrical current; a circuit for measuring the voltage across said sensor at said current, the voltage varying according to changes in the resistance of the strain detector; and a voltage amplifier of a known gain. The pressure of a firearm-firing-chamber is a significant operating parameter of a launcher, preferably a firearm. By determining the pressure in a firing chamber, the time at which bullet passes a sensor, the distance from muzzle to a sensor, and the muzzle velocity of a projectile, the system can place a time mark on the pressure curve corresponding to the time at which the projectile left the muzzle without requiring a special sensor dedicated to determining projectile exit. A measurement of muzzle velocity can also be dispatched to an automatic firearm control system to adjust firearm elevation in response to variations in the muzzle velocity. In addition, a measurement of pressure of a firing chamber can be a useful diagnostic tool for assessing chamber (barrel) wear, amount and kind of gun-powder, or kind, mechanical construction and quality of projectile.

In accordance with another embodiment of the present invention, an apparatus for measuring pressure in a firearm-firing-chamber further includes an integrated system for measuring and calculating exterior and interior ballistics of a firearm bullet and acoustic target means. Preferably, acoustic target means include sensing means arrayed at corners of a triangle for sensing acoustic energy emitted by a bullet and means for generating separate streams of analog signals representative of said acoustic energy sensed at said triangle corners. Even more preferably, sensing means comprise microphones. In a preferred embodiment, acoustic target means include conditioning means connected to said microphones for receiving and conditioning said separate streams of analog signals and producing separate streams of conditioned analog signals therefrom. The conditioning means may include an acoustic preamplifier and a bandpass filter connected in series between each of the sensing means and the converting means. The system does not require a priori prediction of projectile velocity at the target. In contrast to other known systems, the acoustic system array does not require either an open-loop prediction of projectile velocity at the target or extra microphone elements to form a three-dimensional array at the target. The measurement of projectile muzzle velocity and time-of-arrival of the projectile MACH cone at each sensing means, preferably a microphone, allows the computation of ballistic coefficient with an implied velocity at the target, time of flight to the target area plane, and the apparent hit location at the target.

In accordance with a third embodiment of the present invention, an apparatus for measuring pressure in a firearm-firing-chamber further includes an integrated system for measuring and calculating exterior and interior ballistics of a firearm bullet having a plurality of bullet sensors for measuring the relative times at which the bullet passes the plane of each sensor and for producing an analog signal indicative of each time. The photo-electrical bullet sensors and the acoustic target means are each positioned in a row along a path of the moving bullet and in which all times are converted to digital form. Preferably, bullet sensors for measuring the relative times at which bullet the passes the plane of each sensor are photoelectrical sensors. Furthermore, this embodiment of the present invention may be used to measure the relative times at which moving objects other than firearm projectiles, such as automobiles, baseballs or the like, pass the plane of each sensor.

In accordance with a fourth embodiment of the present invention, an apparatus for measuring pressure in a firearm firing-chamber further includes an integrated system for measuring and calculating exterior and interior ballistics of a firearm bullet, acoustic target means and a plurality of bullet sensors for measuring the relative times at which a bullet passes the plane of each sensor and for producing an analog signal indicative of each time. Furthermore, the invention may be used to measure the relative times at which moving objects other than firearm projectiles, such as automobiles, baseballs or the like, pass the plane of each sensor.

Another object is to provide a new and improved system which uses a common time-zero reference for all time measurements including pressure curve and signals at sensors from measuring the relative times at which the bullet passes the plane of each sensor, and at target sensors.

A further object is to provide a new and improved system which is accurate and cost effective, for measuring characteristics of a projectile motion along a path.

Another object is to provide a system for measuring intervals of time of a projectile as it passes between closely spaced sensors such that the measurement accuracy is established primarily by preselected stable parameters.

Still another object is to provide a system which minimizes measurement error by increasing the linearity of the output generated.

Yet another object is to provide a system which allows measuring ballistics using a subsonic projectile or a supersonic projectile.

It is even a further object to provide a system as above which has much flexibility for improvements and modifications. Since the system may include a PC computer and is capable of using many off-the-shelf components, it also provides the desired reduction in cost and flexibility for improvements and modifications.

A further object of the invention is to provide an accurate and practical measuring system, which is readily adaptable to various applications including numerous sport-training uses.

It is another object of this invention to provide a method for integrated measuring and calculating exterior and interior ballistics of a bullet fired from a firearm having a muzzle and a firing chamber, comprising the steps of (a) measuring the muzzle velocity of a projectile by means of at least two detectors (bullet sensors) located near the muzzle of the firearm; (b) measuring a period of time the projectile reaches a point downrange from the firearm by detecting the presence of the projectile; (c) computing a velocity of the bullet at said point by determination of a ballistic coefficient based upon the velocity measurement, the time measurement, and a standard drag function representative of this bullet. Preferably, the muzzle velocity of said bullet is measured by means of three photosensitive detectors located near the firearm muzzle. More preferably, the downrange measurement uses acoustic target means, preferably including three acoustic target sensors which preferably include three microphones. Even more preferably, the step of detecting a downrange-presence of the projectile further includes the step of sensing the passage of the bullet through a monitored plane and generating a substantially real-time analog pulse signals indicative of a passage of the projectile through the plane. Preferably, downrange measurement uses a plurality of bullet sensors mounted in spaced relation relative to a linear path of the projectile and disposed to sense the passage of the projectile through the plane and to generate the analog pulse signals. Preferably, the projectile sensors include photo-electrical projectile sensors.

It is another object of this invention to provide a method for measuring and calculating exterior and interior ballistics of a bullet fired from a firearm having a muzzle and a firing chamber, comprising a method for detecting the energy imparted to a bullet as it exits from a firearm muzzle including the steps of: (a) measuring firearm-firing-chamber pressure as a function of time; (b) placing velocity detector means at a distance d downrange from the muzzle of the firearm; (c) determining velocity at the distance d; (d) computing bullet muzzle exit time from the distance d and the velocity, and (e) computing impulse imparted to the bullet as a time integral of the pressure in the firing chamber from the onset of pressure until the bullet exits the muzzle.

Preferably, the method further has the steps of (a) determining the velocity of the: bullet from a firearm muzzle at a point downrange comprising the steps of: (i) measuring the velocity of said bullet by means of three photosensitive detectors located near the firearm muzzle: (ii) measuring the time said bullet reaches said point downrange by detecting a presence of said bullet; (iii) computing the downrange point velocity by determination of the ballistic coefficient based upon said velocity measurement and said time measurement, and Co) determining the location of any "hits" comprising the steps of: (i) using an acoustic target means sensing and measuring at comers of an equilateral triangle the arrival of acoustic energy emitted by said bullet and generating separate streams of analog signals representative of the acoustic energy sensed at the triangle comers and (ii) convening said separate streams of analog signals from analog to digital form and outputting said separate streams as digital signals.

Preferably, the step of measuring firearm-firing-chamber pressure comprises the steps of (a) using a means for measuring the pressure in a firearm-firing-chamber producing an analog signal indicative of said pressure; and Co) convening said separate streams of analog signals from analog to digital form and outputting said separate streams as digital signals. The method further includes the step of calculating the pressure of said firearm-firing-chamber per a bit-output according to the following formula:

$$PSI/\text{bit} = \frac{2.13 \, N(D^2 - (d - 0.025)^2)}{G(d - 0.025)^2} \quad (1)$$

where:

$$N = \frac{PSI_{Max} \, G(d - 0.025)^2}{435(D^2 - (d - 0.025)^2)} \quad (2)$$

and where: $PSI_{Max}$ is Maximum expected; N is the gain port setting expressed as an integer from 20 to 255; the amplifier voltage gain is defined as Voltage Gain=32500/N; G is the gage factor (G is a specified factor for each individual strain gauge which is provided by the manufacturer with each gauge); D is the outside diameter of the firing-chamber at the gage; and d is the inside diameter of the firing-chamber at the gage. In the preferred embodiment, the means for measuring the pressure of said firearm-firing-chamber further includes an operational strain-detector amplifier, a constant current means for supplying to said strain detector a predetermined constant electrical current, and circuitry for measuring the voltage across said sensor at said constant current, said voltage.

The distance travelled between one set of sensors located near the muzzle to a second set of sensors located downrange can be used to calculate an average velocity ($V_a$) for a total distance in accordance with the formula defining the average velocity:

$$V_a = \frac{V_t - V_m}{2}$$

where
$V_t$=velocity at target
$V_m$=velocity at muzzle, and
$V_a$=average velocity and is calculated by dividing the approximated time of flight by the distance from the muzzle sensors to the downrange sensors.
From this, the equation can readily be rearranged to solve for the velocity at the target, yielding the equation:

$$V_t = 2 V_a - V_m$$

where the terms are as defined above, varying according to changes in the resistance of said strain detector.

The novel features of this invention, as well as the invention itself, and additional objects, features and advantages of the present invention will become apparent to those skilled in the art from the following derailed description taken in conjunction with the accompanying drawings, and which are incorporated herein and constitute part of the present specification.

DETAILED DESCRIPTION OF THE PREFERRED EMBODIMENTS OF THE INVENTION

Figure 1:
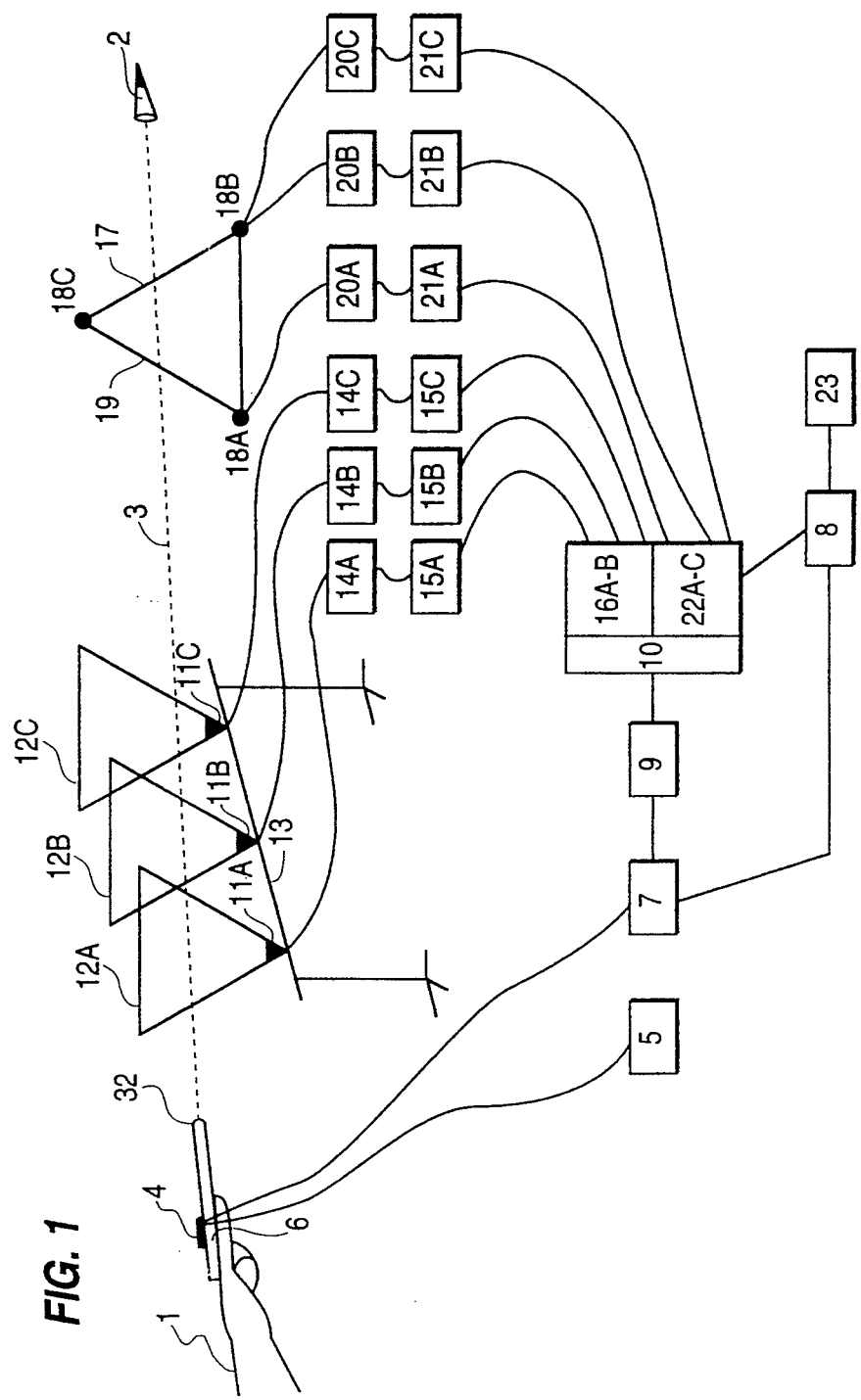
FIG. 1 shows a conceptual block diagram of the elements of the typical arrangement system of the present invention.

Referring to the drawings, wherein like characters designate like or corresponding parts throughout, there is shown in FIG. 1 a preferred arrangement of the apparatus for measuring the pressure in a firearm-firing chamber and for measuring and calculating exterior and interior ballistics of a projectile, wherein a firearm 1 such as a rifle having a firing chamber 6 and a muzzle 32, is to be used to fire a projectile 2 which in turn will follow a substantially straight path indicated by the dashed line 3.

All conditioning means, timing means, sampling means, and converting means are made up of components which are individually well-known to persons of ordinary skill in the art and thus need only be shown in block form. To illustrate these components in detail would not contribute to a better understanding of the invention but instead would only make the explanation of the invention more complex.

Generally, the apparatus includes a means for measuring pressure, a muzzle bullet sensing means, a downrange acoustic target, a set of integrated timing circuits, a processor and an operator interface. The means for measuring pressure are typically positioned on firearm 1 whereas the bullet sensing means and the downrange acoustic target are positioned on the path 3 of projectile 2. Optionally, the downrange acoustic target may be substituted with a set of downrange bullet sensors.

The means for measuring pressure includes a pressure sensor 4 and a means for supplying to the pressure sensor a predetermined constant electrical current 5. The means for supplying to the pressure sensor a predetermined constant electrical current comprises a constant current source which is conventional and readily available. Any number of other modifications and types of such means will suggest themselves to the skilled artisan. Typically, pressure sensor 4, which measures the amount of strain the metal undergoes during the firing, is disposed at least in part at the strain sensitive region of the firearm. Preferably, the pressure sensor is a strain gage. Miniaturized strain gages are commercially available. An example of such a strain gage is the CEA-06-250UW-350 strain gage manufactured by Measurements Group, Inc., of Raleigh, NC. Other pressure sensors than the strain gage specified above can be used. The only requirement that such a sensor must meet is that it must withstand pressure up to at least 100,000 pounds per square inch and should achieve a maximum response from the strain at the outer surface of the firearm-firing chamber. The strain gage is preferably mounted over a firing-chamber 6 of the firearm 1 to measure the stretch or strain caused by the pressure inside. The most desired gage mounting area is over the "middle" of the case body. In some guns, for example with a bolt action rifle, the desired gage mounting area is estimated to be halfway between the receiver and the case shoulder. In any event, for a strain gage to work properly it must be firmly bonded to the steel and it should be positioned so as to achieve optimum response from the strain at the outer surface of the firing chamber of the firearm.

Figure 2:
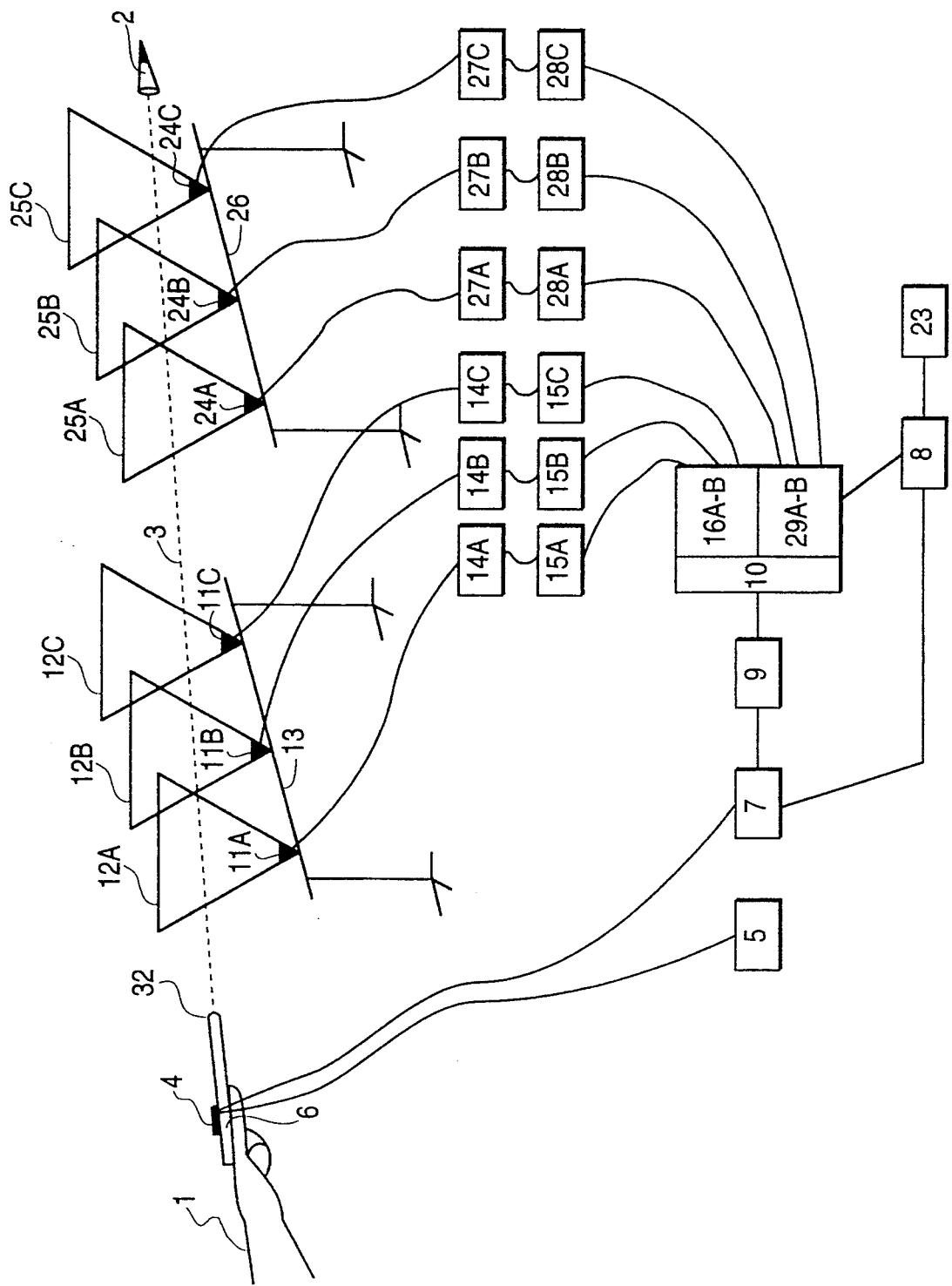
FIG. 2 is a diagrammatic illustration of an alternative arrangement system, where the microphones of the acoustic target have been replaced with downrange bullet sensors, in accordance with another embodiment of the present invention.

As illustrated in FIGS. 1 and 2, the pressure sensor 4, is operatively connected with a means for supplying a predetermined constant current to the pressure sensor, an amplifying circuit 7, preferably an amplifier, for voltage changes induced in the strain gage by the pressure whereby the voltage changes vary according to changes in the resistance of the sensing detector. It is important that the operational amplifier is selected with regard to the avoidance of voltage offset error and to stability of gain. The gain of the amplifier may be controlled by a digital control program stored in the RAM of the processor 8. The amplifying circuit is operatively connected to a digitizing circuit 9 that converts the analog signal representing pressure to a series of digital signals. The digitizing circuit is preferably a digitizer, and more preferably a high speed digitizer. The digitizing circuit is operatively connected to a digital timing circuit 10, which record the time of the digitized pressure signal. The reaction time of the timing circuit is preferably fast. The digitized pressure signal(s) is put into the memory of the processor 8.

Figure 3:
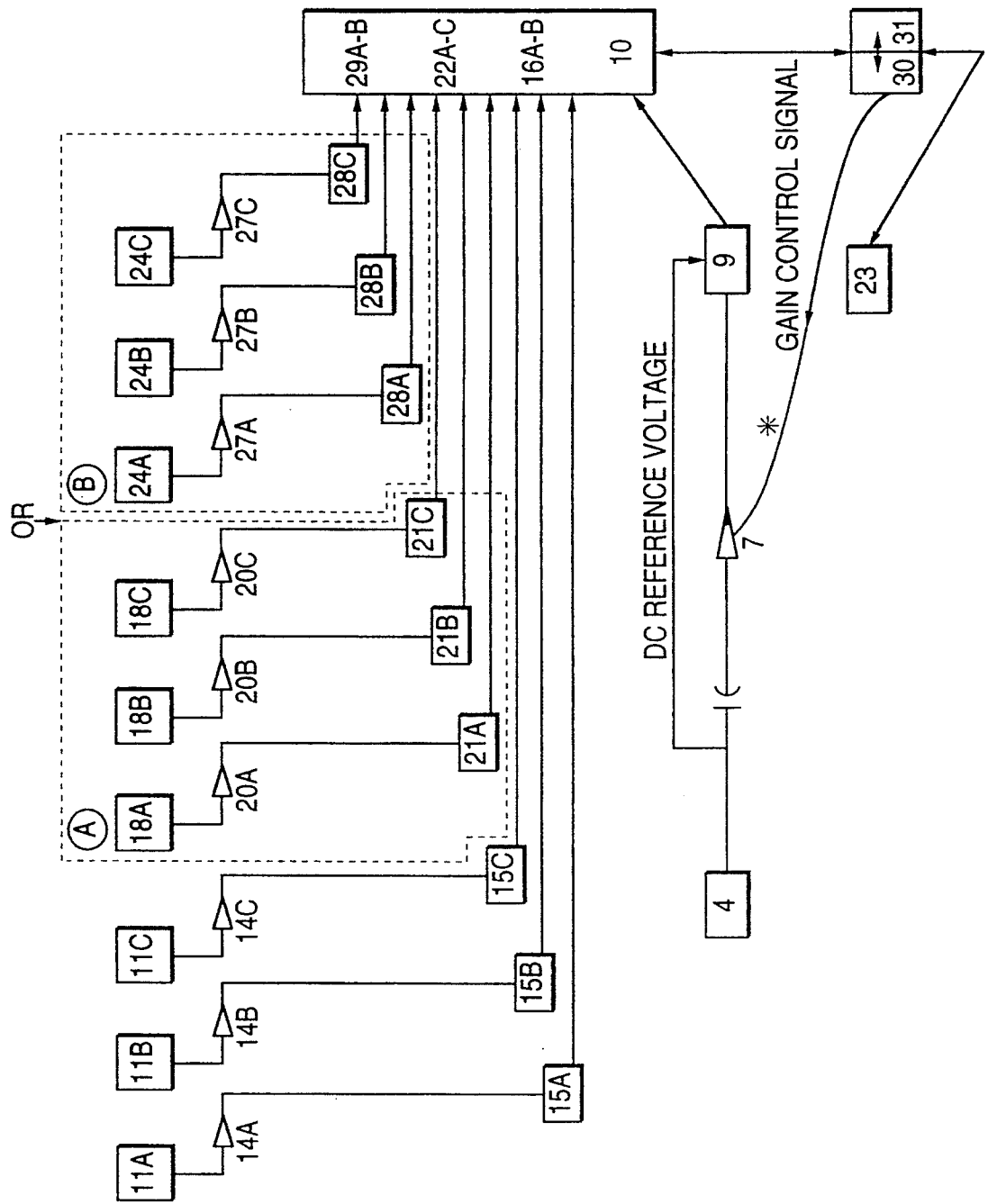
FIG. 3 shows a block diagram.

In operation, the strain gage 4 is energized by a constant current source. This current is constant for the duration of the measurement but may drift slowly with temperature or gage aging and may vary from unit to unit. As shown in FIG. 3, the voltage generated by the constant current passing through the strain gage is used as the reference voltage for the digitizer. This allows the system to be self-compensating because the incremental voltage generated across the strain detector is proportional to the quiescent voltage generated by the constant current. The incremental voltage signal from the strain detector is capacitively coupled from the strain gage through an amplifier of known gain to the digitizing circuit of the system. With this arrangement, the pressure, which is proportional to strain, can be expressed in terms of PSI per bit of digitizer output according to the following equation:

$$PSI/\text{bit} = \frac{2.13\ N(D^2 - (d - 0.025)^2)}{G(d - 0.025)^2} \qquad (1)$$

where:

$$N = \frac{PSI_{Max}\ G(d - 0.025)^2}{435(D^2 - (d - 0.025)^2)}\ . \qquad (2)$$

where:

$PSI_{Max}$ is Maximum expected PSI, N is the gain port setting which is a digital setting to an amplifier gain port and is expressed as an integer from 20 to 255, G is the gage factor, D is the outside diameter of the firing chamber at the gage, and d is the inside diameter of the firing-chamber at the gage.

The gain of the amplifier is determined by the relationship:

Voltage Gain = 32500/N

Gain port setting N is a digital setting to an amplifier gain port. The gain port setting N is selected to provide a peak analog signal that is typically within the upper half of dynamic range of the digitizer. In this particular case, the N value will fall at about 80% of a full scale: of the digitizer.

Interpretations of the pressure time curves can be made by those skilled in the development and manufacture of ammunition and by those designing and testing guns. The chamber pressure is a function of time which is the time pressure curve. For examples, the rise of the pressure curve reflects the burning rate of the propellant; the area under the pressure time curve indicates the impulse applied to the projectile, uniformity of the initial portion of the pressure time curves reflect uniformity of the ignition process; and the peak of the pressure curve represents the maximum stress applied to the gun. The impulse imparted is computed as the time integral of the pressure in the chamber from the onset of pressure until the bullet exits the muzzle.

The major advantages of the integrated strain gage/digitizing section of the system are as follows: (1) the arrangement has no diddle-pot adjustments; (2) it does not use the classic bridge configuration, but it can still compensate for the resistance of the strain gage, the excitation passed through the gage, the temperature, and the reference voltage used for the digitizing circuit, and (3) the gain of the amplifying circuit is adjusted on the basis of the expected maximum pressure and the dimensions of the gun chamber so that the peak analog representing the pressure falls within the upper half of the dynamic range of the digitizer.

Referring again to FIGS. 1 and 2, the path 3 of projectile 2 passes successively through the plane defined and monitored by the muzzle bullet sensing means, preferably muzzle bullet sensors 11A, 11B and 11C, each muzzle bullet sensor being supported on a holder 12 (A through C) to hold it in the desired position along path 3. Although holder 12 shown in FIG. 1 and 2 is a frame being triangular in shape, the holder is not necessarily limited to being a substantially triangle-like shape. It is within the concept of this invention that holder 12 has any other shape and any convenient size, so long as it adheres to the requirement of positioning muzzle bullet sensors 11 in their desired positions and simultaneously allowing a free passage of the bullet through the monitored plane(s). Muzzle bullet sensors 11 are spaced apart by distances such that the transit time between sensors 11A (the first muzzle bullet sensor) and 11B (the second muzzle bullet sensor) is approximately equal to the transit time between sensors 11B and 11C (the third bullet sensor), but both of those distances are significantly different from the distance between sensors 11A and 11C. A support mean 13 of any convenient type can be provided to physically support holders 12 with muzzle bullet sensors 11 thereon and can be made from any convenient materials as PVC, metal, wood, fiberglass, metal, and the like.

One type of a suitable sensor is described in great detail in U.S. Pat. No. 4,845,690, the disclosure of which is explicitly incorporated herein by reference. While photodetectors having photoelectric elements are the preferred sensing means to detect bullet passage through the monitored plane, it will be understood that the present invention may also be practiced through use of any other sensors such as, for example, acoustic sensors, electromagnetic sensors and the like. It is believed that it would be redundant to repeat well-known prior art showings of such means. It will also be understood that the present invention may be practiced through use of light supplied by any light source whether natural or artificial including a laser diode or a light-emitting diode. Details of specific circuitry for detecting the breaking of the light path from laser beams and generating an output pulse in response are not disclosed, since such circuit details are well within the skill in the art.

Each muzzle bullet sensor 11 is operatively connected with a suitable amplifying circuit 14 (A through C). Each amplifying circuit is operatively connected to a timing circuit 16, which is preferably a plurality of timers, and more preferably a plurality of digital timers. Alternatively, each amplifying circuit 14 (A through C) may be connected to the corresponding digitizing circuit 15(A-C), preferably a high speed digitizer, that converts the analog signal representing pulses indicative of the passage of the projectile through the monitored area to a series of digital signals, which in turn is operatively connected to timing circuit 16. Ultimately, signals from the digital timing circuits are fed to the appropriate signal processing circuitry 8, preferably a processor. More detailed description of such timer circuits and connections between sensors, timers and a processor as well as the discussion of general operational principles can be found in U.S. Pat. No. 4,845,690 the disclosure of which is explicitly incorporated herein by reference.

Errors in velocity measurements are most often caused by errors in the bullet sensors per se and/or in improper positioning of the muzzle bullet sensors 11. An apparatus having three bullet sensors provides assurance to the user that the device functions properly. Agreement between the bullet velocities determined for the distances between sensors 11A and 11C and sensors 11A and 11B provides an obvious evidence that apparatus is set-up and is working error-free to the degree indicated by the magnitude of the difference. It should be noted that the function of the double velocity measurement is not to increase precision but to detect errors in set-up and performance of the apparatus. Accordingly, it will be recognized that the invention can be practiced with two muzzle bullet sensors to accomplish the same purpose as the three-sensor embodiment depicted in FIGS. 1 and 3. Similarly, it will be recognized that it would be possible to use four or more sensors; the principles remain the same. Details for modifications in and/or additional necessary connections for electronic circuits are not disclosed since such circuit details are well within the skill of the ordinary artisan.

Referring to FIG. 1, there is illustrated a downrange acoustic target 17 which generally includes sensing means 18A, 18B, and 18C arranged at the corners of a triangular support frame 19. Downrange acoustic target 17 is operable for sensing the acoustic energy and generating analog signals representative of the acoustic energy sensed. Preferably, the acoustic target is mounted downrange at the target area with the sensing means pointing toward the firearm. Sensing means 18 preferably comprises acoustic sensors. In the presently preferred embodiment sensing means 18 comprises three microphones. While microphones are the preferred sensors to detect passage of supersonic bullets at the target area, it will be understood that the present invention may also be practiced through use of any other sensors as long as such sensors detect acoustic energy generated either by a subsonic projectile or by a supersonic projectile. Triangular support frame 19 provides a physical support for the sensing means and defines the opening through which the projectile is to pass the target area. The rods of the triangular support frame can be made from any convenient materials as PVC, wood, fiberglass, and the like.

The spacing between sensing means 18A through 18C can be chosen to accommodate any diameter of projectile whose passage is to be measured by the inventive apparatus. Typically, for hunting rifles, rods up to approximately 90 inches in length might be used for accurate and stable positioning of sensing means. Of course, although the arrangement of sensing means 18A, 18B and 18C is illustrated in the drawings as being in shape of a substantially equilateral triangle, this is primarily for convenience and any desired triangular shape may be employed. Accordingly, it is within the concept of this invention that the triangular support frame is in a shape of, for example, substantially right-angle triangle or substantially isosceles triangle. In fact, any planar configuration or spatial relationship of sensing means 18 is included within the invention, as long as the array of sensing means is arranged to detect passage of a projectile through the plane of the array.

Figure 1A:
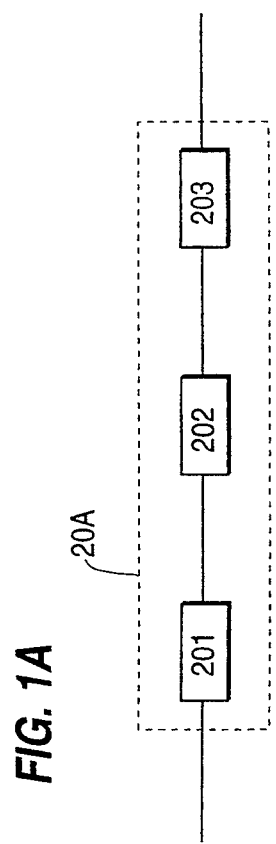
FIG. 1A shows a block diagram of the signal conditioning means.

In the construction of a working model for use with a typical hunting rifle, the downrange acoustic target 17 microphones with microphone heads pointing toward the rifle were used as the sensing means 18A through 18C. The microphones were mounted at the corners of the equilateral triangle having mounting rods approximately 60 inches long. A projectile passing through the target region at the "hit" point produces acoustic energy which is then received by the microphones at three different times. Each analog signal generated by the microphones passes through downrange signal conditioning means 20A through 20C connected between each microphone and the corresponding downrange digitizing circuit 21A through 21C. Preferably, the signal conditioning means are amplifiers of any design well known in the art. Each signal conditioning means 20A–20C may include acoustic preamplifiers 201, band pass filter 202, and amplifiers 203 connected in series as shown in FIG. 1A.

The amplified signals are converted to digital signals by the means 21 for receiving separate streams of analog signals from the means recited above. Optionally, each microphone analog signal may be amplified and bandpassed by the respective pre-amplifier and band-pass filter before is transformed to the digitizing circuits. The output of signal conditioning means 21A through 21C is connected to the corresponding digital timing circuits 22A through 22C, preferably digital timers, which record the times of any digitized acoustic signal that reaches each microphone. Ultimately, the digital signals from the digital timing circuits are fed to the appropriate signal processing circuitry 8, preferably, signal receiving means for receiving said separate streams of digital signals as a data output set. Typically, signal receiving means are the digital control circuits, preferably a processor, more preferably a microprocessor, with associated random access memory. Optionally, downrange signal conditioning means 20, downrange digitizing circuit 21 and downrange timing circuits 22 may be replaced with a smart unit that digitizes the times from downrange sensing means 18 and transmits the digitized information back to processing circuit 8 via radio or laser. The time a bullet reaches a point down range may be determined by detecting the presence of the bullet.

The advantages of the acoustic target employing three microphones are as follows: (1) it operates passively to provide the apparent hi location in the plane of the target; (2) it does not require a priori prediction of projectile at the target; (3) it operates in a wide variety of environmental and site conditions; (4) it allows the computation of ballistic coefficient with an implied velocity at the target (5) ballistic determinations are easier because the microphone array at the target provides a much larger shooting window at the target than does a typical photoelectric screen and (6) it does not require extra microphone elements to form a three dimensional array at the target.

Alternatively, as depicted in FIG. 2, downrange bullet sensors 24 may be used in downrange location in lieu of the acoustic target. Basically, downrange bullet sensors 24 may be similar (in construction and arrangement) to bullet sensors 11A through 11C described above. Briefly, each downrange bullet sensor 24A through 24C is preferably supported on a holder 25(A–C) to hold it in the desired position along path 3. The size and shape of holders 25 can be chosen to accommodate any diameter of projectile whose passage is to be measured by my apparatus. Downrange bullet sensors are spaced apart by distances such that the transit time between sensors 24A (the first downrange bullet sensor), and 24B (the second downrange bullet sensor) is approximately equal to the transit time between bullet sensors 24B and 24C (the third downrange bullet sensor), but both of those distances are significantly different from the distance between sensors 24A and 24C. A support means 26 of any convenient type can be provided to physically support holders 25 with sensors 24 thereon and can be made from any convenient materials as PVC, wood, fiberglass, metal, and the like. While photodetectors having a photoelectric element are the preferred downrange bullet sensors to detect bullet passage through the monitored target area, it will be understood that the present invention may also be practiced through use of any other sensors such as, for example, acoustic sensors, electromagnetic sensors and the like.

Each downrange bullet sensor is operatively connected with a suitable amplifying circuit 27(A–C) which in turn is connected to the corresponding detection circuit 28(A–C), that changes the signal to a pulse-position modulated signal indicative of the passage of the projectile through the monitored area. Each detection circuit is operatively connected to a timing circuit 29, which is preferably a plurality of timers, and more preferably a plurality of digital timers. Ultimately, signals from the digital timing circuits are fed to the appropriate signal processing circuitry 8. It will be recognized that my invention can be practiced with two downrange bullet sensors to accomplish the same purpose as the three-sensor embodiment depicted in FIG. 2. Similarly, it will be recognized that it would be possible to use four or more downrange sensors; again, the principles remain the same. Details for modifications in and/or additional necessary connections for electronic circuits are not disclosed since such circuit details are well within the skill in the art.

Downrange bullet sensors 24 may used to measure downrange ballistics of supersonic and subsonic projectiles. However, in accordance with this important aspect of the present invention, notice should be taken that, if the downrange sensors to detect the bullet passage at the target plane include photodetectors, then the XY-coordinates for the "hit" point (see below) cannot be generated. The most important advantages of the downrange bullet sensors are as follows: (1) the downrange bullet sensors are well suited to work with subsonic projectiles and (2) the operator need not measure exactly the distance between the muzzle sensors and the downrange bullet sensors. The velocity at a point down range may be computed by a determination of a ballistic coefficient based upon (i) said velocity, (ii) said time measurement and (iii) a standard drag function representative of said bullet. The down range time period measurement uses a plurality of bullet sensors mounted in spaced relation relative to a linear path of said bullet and disposed to sense passage of said bullet through the plane and to generate analog pulse signals.

Referring again to FIG. 3, there is shown a signal processing circuitry 8. Briefly, the signal processing circuitry 8 preferably comprises an integrated circuit (I.C.) device 30 and which is programmable to detect particular incoming signals and transferring thereupon the data to the RAM 31. A number of suitable IC's is commercially available. An example of such an integrated IC is the MC68HCl 1E0 manufactured by Motorola, Inc., of Austin, Tex. This chip can be programmed to digitize the pressure data and to perform the digital timer functions necessary for the determination of the pressure-time curve, the "hit" location, ballistic coefficient, burst rate, muzzle and downrange velocities, and other information of interest to the user. This program can reside in read-only-memory of the chip, or the program can be downloaded from the operator's interface 23. It is often preferable that the program be optimized for controlling high-speed digitizing function and for providing many channels of timing functions. Involved mathematical computations can often be implemented more efficiently at the operator's interface where higher level computer programming language and operating system may often be available along with additional RAM. The chip can be permanently pre-programmed. Permanent pre-programming includes data input sequence recognition. The programming of I.C. device with respect to performance of specific functions of this type is conventional and well known. The chip uses this data to form the signal to be transmitted to the operator's computer.

When the operator has entered a particular value for a function to the memory, the chip recognizes it as a signal to store the entered data and to advance to the next input stage ready to receive data values pertaining thereto. This sequencing of stages occurs each time the operator wishes to enter data pertinent to a particular firearm, ammunition, ambient conditions, chronograph/downrange setup, and the like. The sequence may be outlined both in instructions accompanying the device or in any convenient for elsewhere. The system can be programmed to randomly select internal or external ballistics data which the operator wishes to calculate, thus either testing his aim and delivery, or diagnosing the firearm. In addition, any number of other modifications and tests will suggest themselves to those skilled in the art.

The operator's interface 23 is preferably a computer, more preferably a system which is IBM PC, XT, AT or PS/2 computer compatible. A detailed discussion of the structure and/or operation of the computer is not deemed necessary for a complete understanding of the present invention. The minimum requirements for this unit include that it be 8086, 80286 or 80386 based, have at least 384K of RAM, 12 MHz or greater, with one disk drive, a keyboard, and a monitor having graphics capability. The computer may include any convenient devices such as a printer and the like.

Figure 4:
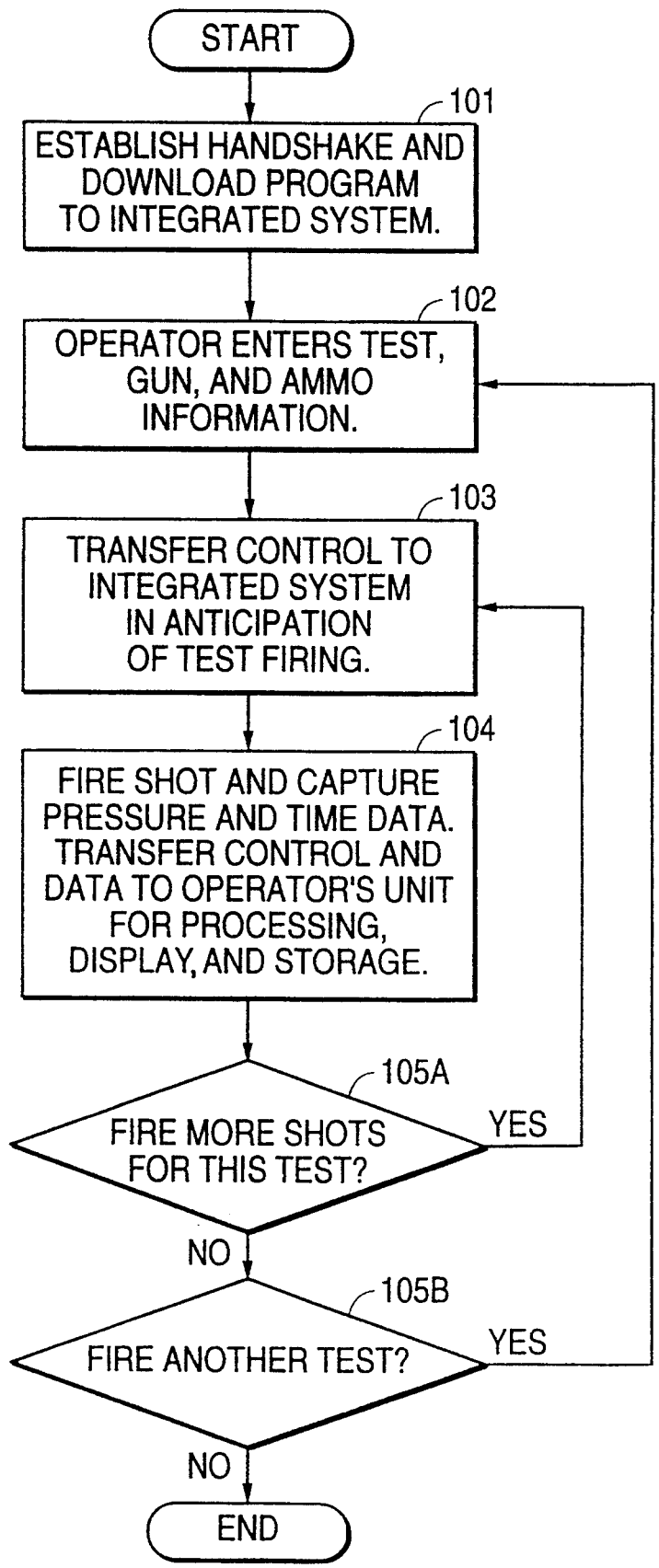
FIG. 4 is a simplified flow chart showing the operational steps performed by processor.

The following description relates to a method of measuring ballistics in a firearm. In the operation of the invention, the operator chooses a firearm, ammunition, ambient conditions, a chronograph/downrange setup inclusive the relevant distances. Next, the operator sets up the apparatus including turning on the operator's interface. Essential flow of programming steps performed by the operator are shown in FIG. 4. To initiate the operation leading to calculate and display ballistics of a projectile, a program must be first downloaded to processor 8, as represented by block 101. Next, the operator inputs into computer 23 the particular characteristic values of that choice including ammo information, as represented by block 102. All this data is commonly available and known to the operator. Among operator-inputed data are the distance between the muzzle and the first bullet sensor 11A, the distance between the first (11A) and third (11C) bullet sensors, the size of acoustic target 17, the distance from the muzzle to acoustic target 17, gun data inclusive the gage factor and the inside and outside diameter of the chamber, and weather conditions. Some data may be pre-programmed into the system by the operator prior to going a shooting-range. Transfer of controls to processor 8 is performed as represented by block 103. After a shot is fired, pressure and time data are captured and transferred together with control data to operator's interface 23 for processing, display and storage, as represented by block 104. Processing is carried out by the software algorithm. It will be appreciated that preparation of the specific set of program instructions is within the skill of any programmer. The resulted data leads to a decision authorizing either to fire more shots for the same test or to fire another test, as represented by blocks 105A and 105B, respectively.

In detail, the pressure sensor measures the amount of strain the metal undergoes during the firing and sends signals through the digitizing unit, preferably a high speed digitizer, The high speed digitizer operates continuously before and during the time the shot is fired, and the digitized data is stored in a circular buffer. The circular buffer retains only a predetermined amount of fresh data before the oldest data in overwritten with new data. The digitizer continues to operate for a present number of samples (typically 80% of the buffer capacity) after the pressure signal first exceeds a significant threshold, preferably a level of approximately 20% of the expected full-scale reading. When digitizing is stopped, the circular buffer will contain digitized signal values for the times immediately prior to the first pressure increase and yet avoids the typical "noise" problems caused by setting the trigger threshold at a low value. The electrical impulses are represented in the form of a time/pressure curve. The system then places a time mark on the pressure curve corresponding to the time at which the bullet left the muzzle. The time at which the pressure signal is first detected to exceed a significant threshold, preferably about 20% of expected full-scale reading, is the common time-zero reference for all time measurements. As the bullet sequentially passes through the bullet sensors, analog signals produced by each sensor are amplified by the corresponding amplifiers, converted to the digital signals by the means for receiving separate streams of analog signals from said means recited above and send to the respective digital timers. Given the real time intervals measured by bullet-sensor-timers, pre-imputed data, including the measured distances between bullet sensors 11A and 11C and between bullet sensors 11A and 11B, the chip computes the initial velocity of the bullet. As the bullet reaches the plane of the downrange acoustic target 17, the acoustic energy triggers the sensors of the acoustic target. The downrange acoustic sensor 18, preferably microphone, nearest the bullet senses the signal first, the second nearest, second, and the farthest sensor senses the signal last. The analog signals from each microphone are amplified, converted to the digital signals by the means recited above and sent to the respective timing circuits. The digital input signals from these digital timing circuits are fed to the appropriate signal processing circuitry, preferably, signal receiving means for receiving said separate streams of digital signals as a data output set. Given the real time intervals measured by acoustic-target-timers, pre-inputed data, including the triangulation data, the chip or the operator's interface computes such parameters as for example, the downrange velocity, ballistic coefficient, time of flight of the bullet and the "hit" location. The XY-coordinates for the "hit" point are generated by the calculating from the location of each of the three microphones 18A through 18C and the time difference of arrival of the acoustic energy at three microphones.

The time of-flight is measured from the second bullet sensor 11B to acoustic target 17 whereby this time is corrected for the delay in bullet's sound hitting the microphone as the bullet passes the microphone. The down range velocity is calculated from the muzzle velocity, time of flight and distance. It should be noted that the computation of velocity remaining at the target, the ballistic coefficient, and XY-coordinates at the target require iterative techniques. If the bullet sensors are used downrange, the time-of-flight is measured between the second muzzle bullet sensor 11B and the second downrange bullet sensor 25B, the downrange velocity is measured between the first (25A) and third (25C) downrange bullet sensors.

It has thus been shown that there are provided devices, systems and methods which achieve the various objects of the invention and which are well adapted to meet the conditions of practical use.

Although the present invention has been illustrated with particular reference to a target shooting application, it should be understood that the invention is not limited to measuring the internal and external ballistics of a bullet. Rather, as disclosed above, the inventive device may be adapted to games which involve skill in throwing or striking a projectile and directing it toward a target, a goal and the like. Such applications include, for example, training devices for golf, tennis, baseball, football, squash, soccer, volleyball, bowling, boxing, fencing, archery and karate, wherein speed and flight characteristics of an object's motion, such as for a ball, sword, arrow, bullet or hand, are displayed as an aid in performance evaluation. Accordingly, it is noted that the acoustic target may be mounted in any plane, horizontal through vertical, as required for a given application. For example, for baseball, tennis, archery and bowling applications acoustic targets would preferably be in the vertical plane. For golf and football applications the acoustic targets would be mounted in a horizontal plane.

The present invention has been particularly shown and described with reference to preferred embodiments thereof. However, it will be understood by those skilled in the art that other embodiments and various modifications, combinations and substitutions in the form and detail may be made therein without departure from the true spirit and scope of the invention in its broader aspects as defined by the appended claims.

What is claimed is:

1. An apparatus for measuring ballistics in a firearm comprising in combination:

(a) an outside-surface-mounted means for measuring pressure in a firearm firing-chamber according to the following formula:

$$PSI/bit = \frac{2.13\ N(D^2 - (d - 0.025)^2)}{G(d - 0.025)^2}$$

where the voltage amplifier gain equals 32500/N and N is computed by:

$$N = \frac{PSI_{Max}\ G\ (d - 0.025)^2}{435\ (D^2 - (d - 0.025)^2)}$$

and where $PSI_{Max}$ is Maximum expected PSI,

N is the gain port setting which is a digital setting to an amplifier gain port and is expressed as an integer from 20 to 255, G is the gage factor, D is the outside diameter of the firing chamber at the gage, and d is the inside diameter of the firing chamber at the gage; and producing an analog signal indicative of said pressure;

(b) a target means located at a predetermined point producing an analog signal indicative of time;

(c) means for receiving separate streams of analog signals from said means for measuring pressure and from said target means, and for converting said separate streams of analog signals from analog to digital form and for outputting said separate streams as digital signals:

(d) signal receiving means for receiving said separate streams of digital signals as a data output set; and (e) means for computing an estimated velocity and ballistics from said digital output set.

2. The combination of claim 1, further comprising a second target means located at a second predetermined point downrange from said first target means wherein said second target means is an acoustic target means.

3. The combination of claim 2, wherein said acoustic target means includes sensing means arrayed at corners of a triangle for sensing acoustic energy emitted by a bullet and means for generating separate streams of analog signals representative of said acoustic energy sensed at said triangle corners.

4. The combination of claim 3, in which said sensing means comprise microphones.

5. The combination of claim 4 in which said acoustic target means include conditioning means connected to said microphones for receiving and conditioning said separate streams of analog signals and producing separate streams of conditioned analog signals therefrom.

6. The combination of claim 5, in which said conditioning means comprises (a) an acoustic pre-amplifier and a band-pass filter connected in series between each of said sensing means and said means for receiving separate streams of analog signals from said means for measuring pressure and from said target means;

(b) means for converting said separate streams of conditioned analog signals from analog to digital form; and (c) means for outputting said separate streams of conditioned signals as digital signals, 7. The combination of claim 3, further comprising a plurality of bullet sensors for measuring relative times at which bullets pass the plane of each sensor and for producing an analog signal indicative of the relative time.

8. The combination of claim 7, in which said bullet sensors and acoustic target means are positioned in a row along a path of said moving bullet and in which all times are converted from analog to digital form.

9. The combination of claim 8, further comprising a microprocessor having a random access memory for storage of both an operating program and measured data, and means for transferring any of said digital signals to said random access memory, and means for both receiving said operating program from a controlling computer and for sending said measured data to the controlling computer.

10. The combination of claim 9, further comprising means for storing reference information data and associating said measured data for retrieval with said data output set at a later time, means for inputting reference information data and display means for displaying at least a portion of said data output set.

11. The combination of claim 1, wherein said target means comprises a plurality of bullet sensors for measuring relative times at which a bullet passes a plane of each sensor and for producing an analog signal indicative of each relative time.

12. The combination of claim 11, in which said bullet sensors for measuring the relative times at which bullets pass a plane of each sensor are photo-electrical sensors.

13. The combination of claim 1, further comprising a microprocessor having a random access memory for storage of both an operating program and measured data, means for transferring any digital signals to said random access memory, and means for both receiving said operating program from a controlling computer and for sending said measured data to the controlling computer.

14. An apparatus for measuring ballistics in a firearm comprising in combination:
   (a) means for measuring pressure in a firearm firing-chamber according to the following formula:

$$PSI/\text{bit} = \frac{2.13 \, N(D^2 - (d - 0.025)^2)}{G \, (d - 0.025)^2}$$

$$N = \frac{PSI_{Max} \, G \, (d - 0.025)^2}{435 \, (D^2 - (d - 0.025)^2)}$$

and where
   $PSI_{Max}$ is Maximum expected PSI,
   N is the gain port setting which is a digital setting to an amplifier as an integer from 20 to 255,
   G is the gage factor,
   D is the outside diameter of the firing chamber at the gage, and
   d is the inside diameter of the firing-chamber at the gage; and producing an analog signal indicative of said pressure where said means include:
   (i) a strain sensor disposed at least in part on a strain sensitive region of said firearm firing-chamber, said strain sensor having a piezo-resistive means being oriented to achieve maximum response from a strain at an outer surface of the firearm firing-chamber;
   (ii) a means for supplying to said strain sensor a predetermined constant electrical current:
   (iii) a circuit for measuring voltage across said sensor, said voltage varying according to changes in resistance of said strain sensor; and
   (iv) a voltage amplifier of a known gain;
   (b) means for receiving analog signals from said circuit and for converting said signals from analog to digital form and for outputting said digital signals; and
   (c) signal receiving means for receiving said digital signals as a data output set.

15. A method for integrated measuring and calculating exterior and interior ballistics of a bullet fired from a firearm having a muzzle comprising the steps of:

(a) measuring the pressure in the firing chamber of the firearm using the following formula:

$$PSI/\text{bit} = \frac{2.13 \, N(D^2 - (d - 0.025)^2)}{G \, (d - 0.025)^2}$$

$$N = \frac{PSI_{Max} \, G \, (d - 0.025)^2}{435 \, (D^2 - (d - 0.025)^2)}$$

p1 and where
   $PSI_{Max}$ is Maximum expected PSI,
   N is the gain port setting which is a digital setting to an amplifier gain port and is expressed as an integer from 20 to 255,
   G is the gage factor,
   D is the outside diameter of the firing chamber at the gage, and
   d is the inside diameter of the firing-chamber at the gage;
   (b) measuring the velocity of a bullet by means of at least two detectors located at a first predetermined location near the firearm muzzle;
   (c) measuring a period of time said bullet reached a second predetermined location downrange from the firearm by detecting a presence of said bullet.; and
   (d) computing a velocity of said bullet at said second predetermined location downrange by a determination of a ballistic coefficient based upon (i) said velocity, (ii) said time measurement, and (iii) a standard drag function representative of said bullet.

16. The method of claim 15, wherein the velocity of said bullet is measured by means of three bullet sensors located near the firearm muzzle.

17. The method of claim 16, wherein said bullet sensors include photo-electrical bullet sensors.

18. The method of claim 15, wherein said downrange measurement uses an acoustic target means.

19. The method of claim 18, wherein said acoustic target means comprises three microphones.

20. The method of claim 19, wherein the step of detecting a downrange-presence of said bullet comprises sensing passage of said bullet through a monitored plane, and generating a substantially real-time analog signal indicative of a passage of said bullet through said plane.

21. The method of claim 18, wherein said acoustic target means includes at least three sensors.

22. The method of claim 15, wherein in step (b) downrange measurement uses a plurality of bullet sensors mounted in spaced relation relative to a linear path of said bullet and disposed to sense passage of said bullet through plane and to generate analog pulse signals.

23. A method for measuring exterior and interior ballistics of a bullet fired from a firearm having a muzzle and a firing chamber by detecting energy imparted to a bullet at its exit from the muzzle of the firearm, comprising the steps of:
   (a) measuring firearm-firing chamber pressure as a function of time wherein the pressure is calculated according to the following formula:

$$PSI/\text{bit} = \frac{2.13 \, N(D^2 - (d - 0.025)^2)}{G \, (d - 0.025)^2}$$

$$N = \frac{PSI_{Max} \, G \, (d - 0.025)^2}{435 \, (D^2 - (d - 0.025)^2)}$$

and where $PSI_{Max}$ is Maximum expected PSI,

N is the gain port setting which is a digital setting to an amplifier gain port and is expressed as an integer from 20 to 255, G is the gage factor, D is the outside diameter of the firing chamber at the gage, and d is the inside diameter of the firing-chamber at the gage;

(b) placing velocity detector means at a known distance d downrange from the muzzle of the firearm;

(c) determining the velocity of the bullet at said distance d;

(d) computing bullet muzzle exit time form the distance d and the velocity, and (e) computing impulse imparted to the bullet as a time integral of the pressure in the chamber from the onset of pressure until the bullet exits the muzzle.

24. The method of claim 23, wherein the step of measuring firearm-firing-chamber pressure comprises the steps of:

(a) using a means for measuring pressure in a firearm firing-chamber by producing an analog signal indicative of said pressure;

(b) converting said separate streams of analog signals from analog to digital form and outputting said separate streams as digital signals, and (c) converting the digital signals to digital information.

25. The method of claim 24, further comprising the steps of performing processing, display, storage and retrieval of said digital information.

26. The method of claim 25, wherein (a) said means for measuring the pressure of said firearm-firing-chamber further comprises:

(i) a voltage amplifier of known gain and having a gain port;

(ii) a current means for supplying to said strain sensor a constant electrical current during the time of said ballistic measurement, and (iii) circuitry for measuring the voltage across said sensor at said current, said voltage change varying according to changes in the resistance of said sensor; and (b) said firing chamber of the firearm has an inside diameter and an outside diameter.

27. The method of claim 24:

(a) wherein the step of determining the velocity of the bullet at said distance d from a firearm muzzle at a point downrange comprises the steps of:

(i) measuring the velocity of said bullet by means of at least two bullet sensors located near the firearm muzzle:

(ii) measuring a period of time said bullet reaches said distance d downrange from the firearm by detecting a presence of said bullet;

(iii) computing a downrange distance d velocity by determination of a ballistic coefficient based upon said velocity measurement and time, and (b) further comprising the step of determining the location of the bullet at said distance d comprising the steps of:

(i) using an acoustic target means located at said distance d for sensing and measuring at corners of a triangle to sense arrival of acoustic energy emitted by said bullet, and generating separate streams of analog signals representative of the acoustic energy sensed at the triangle corners, and (ii) converting said separate streams of analog signals from analog to digital form and outputting said separate streams as digital signals which represent the time at which the acoustic energy first arrives at corners of the triangle.

28. A method for measuring ballistics of a bullet fired from a firing arm having a muzzle, comprising the steps of:

(a) measuring the pressure in the firing chamber of the firearm using the following formula:

$$PSI/\text{bit} = \frac{2.13 \, N(D^2 - (d - 0.025)^2)}{G \, (d - 0.025)^2}$$

$$N = \frac{PSI_{Max} \, G \, (d - 0.025)^2}{435 \, (D^2 - (d - 0.025)^2)}$$

and where $PSI_{Max}$ is Maximum expected PSI,

N is the gain port setting which is a digital setting to an amplifier gain port and is expressed as an integer from 20 to 255, G is the gage factor, D is the outside diameter of the firing chamber at the gage, and d is the inside diameter of the firing chamber at the gage; measuring the bullet muzzle velocity ($V_o$) at a set of muzzle sensors located at a first predetermined location near the muzzle, wherein said bullet muzzle velocity ($V_m$) is measured directly from the time of flight between each of said muzzle sensors and the known distances between the sensors;

(b) approximating the time of flight from the set of muzzle sensors at said first predetermined location by measuring the time difference between passage of the bullet at the muzzle sensors at said first predetermined location and the arrival of the acoustic energy generated by the bullet's passage at a set of downrange acoustic sensors located at a second predetermined location;

(c) calculating the velocity at the target in accordance with the formula:

$$V_t = 2 V_a - V_m$$

where $V_t$ = velocity at the target $V_m$ = velocity at the muzzle, and $V_a$ = average velocity and is calculated by dividing the approximated time of flight by the distance from the muzzle sensors to the downrange sensors;

(d) computing an apparent hit location at a plane of the downrange acoustic sensors using the difference in arrival times of the acoustic energy generated by the bullet's passage at the downrange acoustic sensors, the location of the downrange acoustic sensors, the ambient conditions, and the $V_t$ from step (c);

(e) correcting the approximated time of flight to compensate for passing of the bullet through the plane of the downrange acoustic sensors before the acoustic energy generated by the bullet's passage reaches said downrange acoustic sensors; and (f) determining a ballistic coefficient that is consistent with the velocity at the muzzle ($V_m$), the distance from said muzzle sensors to said downrange acoustic sensors, the approximated time of flight, and the distance from the muzzle sensors to the downrange acoustic sensors.

* * * * *